Sept. 4, 1923.  1,466,881
A. E. JOHNSON
CRANK SHAFT TURNING DEVICE
Filed Aug. 3, 1921    3 Sheets-Sheet 1
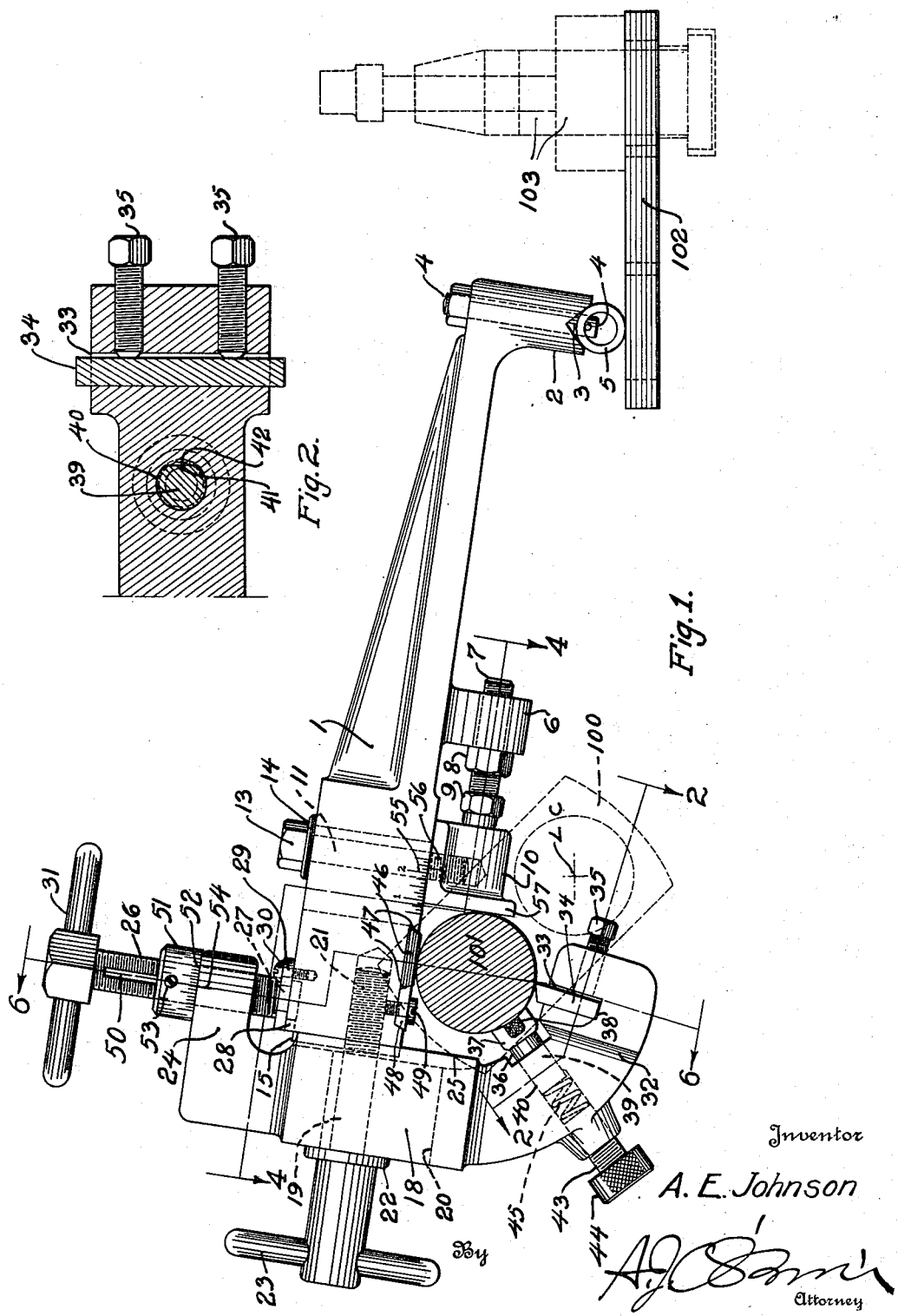

Sept. 4, 1923.  1,466,881
A. E. JOHNSON
CRANK SHAFT TURNING DEVICE
Filed Aug. 3, 1921  3 Sheets-Sheet 2

Inventor
A. E. Johnson.
By
Attorney

A. E. Johnson.

Patented Sept. 4, 1923.

1,466,881

UNITED STATES PATENT OFFICE.

ALFRED E. JOHNSON, OF DENVER, COLORADO.

CRANK-SHAFT-TURNING DEVICE.

Application filed August 3, 1921. Serial No. 489,633.

*To all whom it may concern:*

Be it known that I, ALFRED E. JOHNSON, a citizen of the United States, residing at the city and county of Denver and State of Colorado, have invented certain new and useful Improvements in Crank-Shaft-Turning Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a device for turning the connecting rod bearings on crank shafts.

It is well known that the connecting rod bearings on the crank shaft of a gas engine has a tendency to wear to a non-circular cross section due no doubt to the fact that the greatest pressure is always exerted on the same side of the bearing.

The truing of the connecting rod bearings of a crank shaft in an ordinary lathe entails a considerable amount of work of a more or less difficult nature which makes the operation expensive; the result of which is that this fault is seldom corrected.

It is the object of my present invention to devise a tool by means of which the connecting rod bearings of a crank shaft can be turned with a very small amount of labor. The tool is simple in construction and can be made and sold at a price which will put it within the reach of all machine shops.

In order to explain fully and clearly my invention, I shall refer to the accompanying drawings in which—

Fig. 1 is a side elevation of my tool in operative position.

Fig. 2 is a cross section taken on line 2—2 Fig. 1.

The same reference characters will be used to indicate the same parts throughout the several views.

Figure 3:
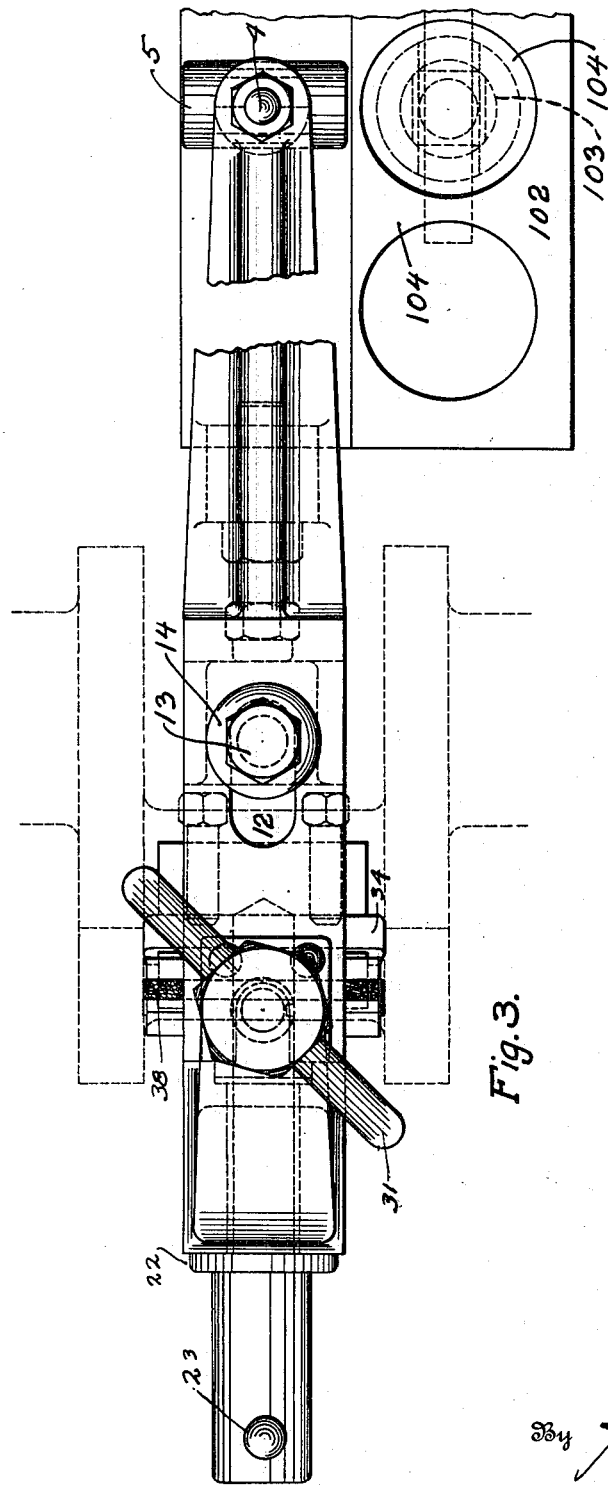
Fig. 3 is a top plan view of the tool shown in Fig. 1.
Figure 4:
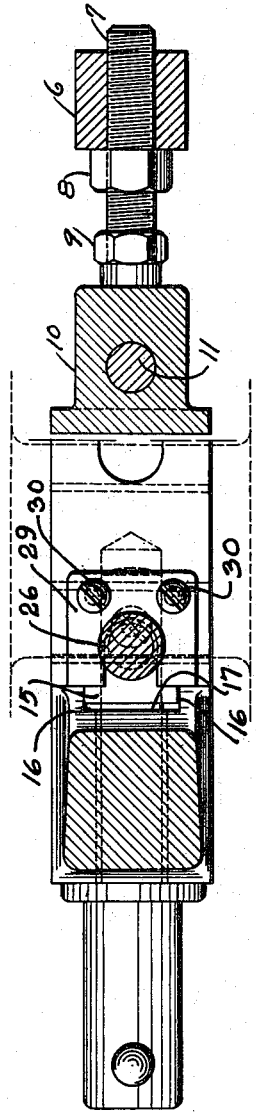
Fig. 4 is a section taken on line 4—4, Fig. 1.
Figure 5:
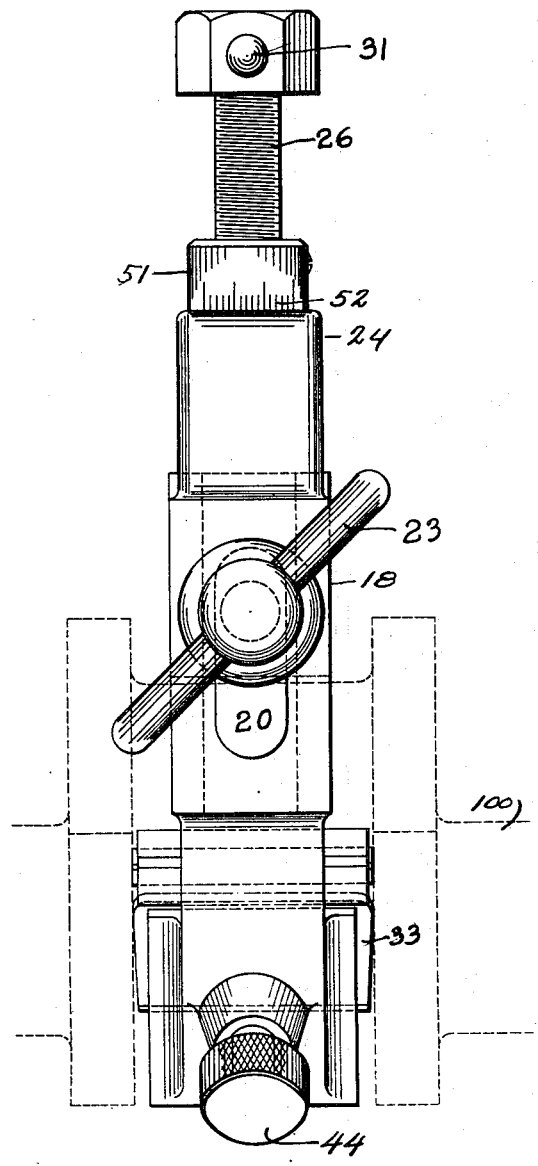
Fig. 5 is an end elevation of the tool shown in Fig. 1.
Figure 6:
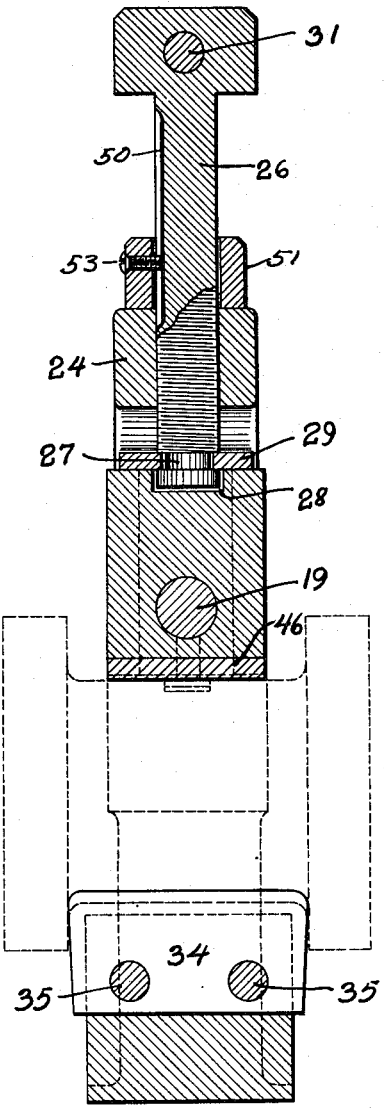
Fig. 6 is a section taken on line 6—6, Fig. 1.

The tool comprises an arm 1 having a downwardly projecting portion 2, the lower end of which has a transverse V-shaped groove 3 in which is firmly clamped, by means of bolt 4, a short piece of pipe 5, the purpose of which will hereafter appear. The lower side of arm 1 is provided with a downward projection which is provided with a screw threaded hole for the reception of bolt 7. Bolt 7 is provided with a lock nut 8 and a hexagonal head 9. An angular abutment 10 is slidably connected to arm 1 by means of a bolt 11 which extends through a slot 12 in arm 1 and has screw threaded engagement with the angular block 10. Bolt 11 has a hexagonal head 13 between which and the surface of bar 1 is placed a washer 14. The other end of bar 1 is provided with a projecting portion 15 having parallel sides 16 for engagement with a groove 17 in an adjustable tool holding member 18 which is held in place on arm 1 by means of a bolt 19 which passes through a slot 20 in member 18 and has screw threaded engagement with the end of arm 1 as indicated by numeral 21. Bolt 19 is provided with an integral flange 22 for engaging the surface of part 18 and a handle 23 for turning the same. The upper end of member 18 has a part 24 projecting beyond the plane of surface 25. Extending through projection 24 is a bolt 26 which has screw threaded engagement with said projection. The lower end of bolt 26 has a reduced portion or annular groove 27 and projects into a slot 28 in the upper surface or arm 1. Bolt 26 is held in place by a U-shaped plate 29 which straddles the reduced portion 27 of bolt 26 and is held in place on the upper surface of arm 1 by means of screws 30. Bolt 26 is provided with a handle 31 for rotating the same. From the above it is evident that if we release bolt 19 sufficiently to permit member 18 to slide on the end of member 1 and then rotate bolt 26, we can move member 18 in either direction across member 1 and if we remove bolt 19 entirely, member 18 and bolt 26 can be bodily removed from arm 1. The lower end 32 of member 18 is curved towards arm 1 and is provided near the end of said curved part with a transverse rectangular slot 33 for the reception of a cutting tool 34 which is clamped in position by screws 35. Between groove 33 and surface 25 is a shallow transverse groove 36 for the reception of a lubricator 37 which has a cavity 38 for the reception of a piece of felt which is saturated with oil. Lubricator 37 has a shank 39 which projects into hole 40 in part 32 and is adapted to reciprocate therein. Shank 39 has a flattened portion 41 which cooperates with a flat portion 42 of hole 40 to prevent turning, or, the flattened portion 41 may cooperate with the end of a screw (not shown) which extends into the hole 40 for this purpose. The outer end of hole 40 is screw threaded and contains a screw 43 having a knurled head 44 by means of which it can be readily rotated for adjustment. Between the ends of shank 39 and screw 43 is a helical spring 45 which tends to force the lubricator 37 against the material operated upon. Arm 1 is provided, on its under side, directly above the cutting tool 34 with a hardened steel plate which is provided with beveled sides 47 and is held in place by a plate 48 which is adjustably secured to the under side of arm 1 by means of screws 49. It is essential that the cutting edge of the tool 34 should be exactly parallel with the surface of steel plate 46 and for this reason great care is taken to make the bottom of groove 33 parallel with the surface of arm 1 upon which plate 46 rests. Plate 46 is made of a plate of even thickness and the cutting edge of tool 34 is made parallel with the base thereof, whereby the surface of plate 46 and the cutting edge of tool 34 will be parallel to each other when assembled.

I have shown bolt 26 provided with a longitudinal groove 50 and surrounded by a ring 51 provided with equally spaced graduations 52 along the lower edge thereof and a screw 53 for engaging in slot 50. The upper edge of member 24 is provided with one or more lines or graduations 54 which cooperate with the graduations 52 on ring 51 to form a vernier whereby the amount member 18 is adjusted, can be readily determined.

The lower edge of member 1 is provided with a scale 55 cooperating with a mark 56 on angular member 10. Scale 55 has units one-half inch in length which are sub-divided into eight equal spaces. If the line 56 coincides with the line marked "2" then face 57 of block 10 will be one inch from a plane perpendicular to the surface of plate 46 and passing through the cutting edge of cutting tool 34 and will consequently be placed in proper position for operating on a piece two inches in diameter.

The operation of my device is as follows: The crank shaft 100 is mounted between the lathe centers in such a manner that the center of the main bearing portions are in line with the main centers of the lathe. The turning tool is then adjusted about the connecting rod bearing 101 in the manner shown in Fig. 1. A plate 102 is secured to the tool post 103 of the lathe in the manner shown in Figs. 1 and 3, said plate being provided with holes 104 for receiving the tool post. Plate 102 is securely clamped in position in a manner well understood. Plate 102 is so adjusted that pipe 5 may rest upon it. If the lathe is started and rotated in a clockwise direction (Fig. 1) crank shaft 100 will rotate about lathe centers LC and the connecting rod bearing 101 will also rotate about centers LC describing a circle whose diameter is equal to the stroke of the engine. Since the rotation of the shaft is in a clockwise direction the surface of connecting rod bearing 101 will be forced to rotate against the edge of cutter tool 34, as the tool cannot rotate being prevented from so doing by pipe 5 resting on plate 102. As the crank shaft rotates, it is evident that pipe 5 will reciprocate on the surface of plate 102 and cause relative rotation between the connecting rod bearing and the cutting edge of tool 34. In building my tool care is taken to have the pipe 5 parallel with the cutting edge of tool 34. As plate 102 has its upper surface parallel to a line joining the lathe centers, it is evident that the cutting edge of tool 34 will always be parallel to a line joining the lathe centers. Bolt 7 is adjusted so that its head will abut against the angular block 10 and form a positive stop. Lubricator 37 engages the bearing just back of the cutting tool 34 and holds it resiliently against surfaces 46 and 57 which latter surfaces receive all the strain due to cutting. The adjustment of the cutter is accomplished by bolt 26 in the manner indicated above. As the sole object is to make the bearing surface round and not to reduce it to any predetermined diameter, the cutting operation is usually stopped when it is found that this has been accomplished. It is, however, perfectly feasible to reduce the bearing to a predetermined diameter by this tool.

Although I have described my turning tool as used for truing the connecting rod bearings which rotate in a circle about the lathe centers, it should not be understood that this is the only use to which it can be put. My tool is equally well adapted for truing the main bearings which are concentric with the lathe centers, but as these can be trued without trouble by the ordinary lathe tools, I have described the operation of my device with special reference to the connecting rod bearings.

The device described above and shown on the accompanying drawing is what I now consider to be the preferred form but it is evident that changes can be made in the structure without departing from the spirit of the invention as set forth in the claims.

I desire to point out here that it is immaterial whether the crank shaft is mounted so as to revolve on the axis of the main bearings or not, it being merely necessary that it should rotate on an axis that is parallel to the axis of the bearing that is to be turned.

Having described my invention or discovery and the best manner in which I have contemplated making and using the same what I claim is:

1. A tool for turning the connecting rod bearings of an engine crank shaft, comprising an arm (1) having a transversely arranged guide member (5) connected to one end thereof, a tool holder (18) attached to and transversely movable across the other end thereof, a stop member (10) longitudinally movable on said arm and provided with a stop surface (57) and a cutting tool (34) carried by said tool holder.

2. A tool for turning the connecting rod bearings of a multiple cylinder crank shaft comprising an arm having a guide member connected to one end thereof, a tool holder attached to and transversely movable across the other end thereof, a stop member longitudinally movable on said arm, an adjustable abutment for said stop, a stop surface on said stop member, a cutting tool carried by said tool holder and means for moving said cutting tool towards or away from said arm.

3. A tool for turning the connecting rod bearings of a multiple cylinder crank shaft comprising an arm having a guide member connected to one end thereof, a tool holder attached to and transversely movable across the other end thereof, a stop member longitudinally movable on said arm, an adjustable abutment for said stop, a stop surface on said stop member, a lubricator carried by said tool holder, a cutting tool carried by said tool holder and means for moving said cutting tool towards or away from said arm.

4. A tool for turning the connecting rod bearings of a multiple cylinder crank shaft comprising an arm having a guide member connected to one end thereof, a tool holder attached to and transversely movable across the other end thereof, a stop member longitudinally movable on said arm, an adjustable abutment for said stop, a stop surface on said stop member, a lubricator carried by said tool holder, resilient means biasing said lubricator inwardly, a cutting tool carried by said tool holder and means for moving said cutting tool towards or away from said arm.

5. A tool for turning the connecting rod bearings of a multiple cylinder crank shaft while it rotates on the axis of its main bearings, comprising an arm having a transversely arranged guide member rigidly attached to one end thereof, a tool holder attached to and transversely movable across the other end thereof, a projecting guide on said end, a channel in said tool holder cooperating with said guide, means for clamping said tool holder to the end of said arm, means for moving said tool holder transversely of said arm, a stop member longitudinally movable on said arm, means for clamping said stop to said arm, an adjustable abutment for engaging said stop, a transverse slot in said tool holder, a cutting tool in said slot, means for clamping said cutting tool in place and a lubricator resiliently secured to said tool.

6. A tool for turning a bearing, while it rotates about an axis parallel to but spaced from its own axis, comprising an arm having a guide member attached to one end thereof, a tool holder attached to and transversely movable across the other end, means for adjusting said tool holder, means for clamping the tool holder to the arm, a stop member longitudinally adjustable on said arm, an adjustable abutment for said stop, a tool carried by said holder and a lubricator resiliently connected to said tool holder.

7. A tool for turning connecting rod bearings of an engine crank shaft comprising an arm (1) having secured to one end a cylindrical guide member (5), a guide plate cooperating therewith, a transversely slidable tool holder (18) secured to the other end of said arm, a cutting tool (33) carried by said tool holder, said cutting tool having its cutting edge parallel to said guide member.

In testimony whereof I affix my signature.

ALFRED E. JOHNSON.